United States Patent Office 3,535,378
Patented Oct. 20, 1970

3,535,378
ALKYLENE OXIDE ADDUCTS OF METHYL-
CYCLOHEXYLENE DIAMINE
James M. Cross, New Martinsville, W. Va., and Sidney
H. Metzger, Pittsburgh, Pa., assignors to Mobay
Chemical Company, Pittsburgh, Pa.
No Drawing. Filed Oct. 3, 1966, Ser. No. 583,991
Int. Cl. C07c 87/38; C08f 47/10
U.S. Cl. 260—563                                      7 Claims

ABSTRACT OF THE DISCLOSURE

This invention pertains to oxyalkylated methylcyclohexylene diamines of the formula

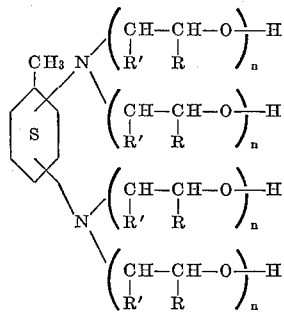

wherein R and R' are selected from the group consisting of hydrogen, lower alkyl or phenyl and $n$ is 0 or a positive integer with the proviso that $n$ is a positive integer at least once on each nitrogen atom. The compounds find particular utility in the preparation of cellular polyurethanes.

---

This invention relates to new chemical compositions and more particularly, to compositions which have useful application as intermediates in the preparation of foams.

It is therefore an object of this invention to provide new chemical compositions. It is another object of this invention to provide compositions useful in the preparation of foams. It is another object of this invention to provide compositions containing active hydrogen atoms.

The foregoing objects and others which will become apparent from the following description are accomplished in accordance with the invention generally speaking by providing alkylene oxide adducts of methylcyclohexylene diamine wherein at least the two primary amino hydrogen atoms are oxyalkylated. Thus, the invention contemplates compounds exemplified by the following general formula:

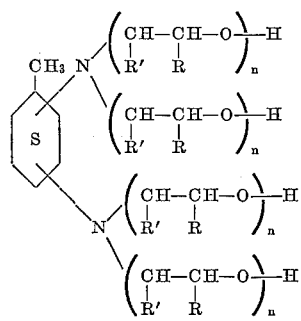

wherein R and R' are hydrogen, lower alkyl or phenyl; and R' is preferably hydrogen; $n$ is either 0 or a positive integer and is a positive integer at least once on each nitrogen atom. Of course, any amount of substitution greater than two and up to 4 is contemplated and is within the purview of this invention. Also, in accordance herewith, the products resulting from the condensation of the hydroxyl groups of each alkylene oxide radical, which reacts with each hydrogen of the amino groups, with further amounts of alkylene oxides whether they be the same or different is within the contemplated scope of this invention. Thus, polyethers are formed where an alkylene oxide is reacted equivalent for equivalent with the amino hydrogen atoms of the diamine and this material is further condensed with more alkylene oxide. The alkylene oxide adducts of the invention are useful as solvents, non-ionic detergents and as valuable intermediates in the preparation of polyurethanes. Because of their polyfunctional nature, the compounds are particularly suited for reaction with diisocyanates in the preparation of rigid foams. The adducts containing amino groups are particularly suitable for sprayed urethane foams because of the speed with which these materials set up. Such foams are useful in covering the underside of horizontal surfaces where it is difficult to maintain the sprayed material in position.

Methylcyclohexylene diamine is prepared by the ring hydrogenation of tolylene diamine. Tolylene diamine is available in the form of various isomers such as 2,4-tolylene, 2,6-tolylene diamine, isomeric mixtures of 2,4- and 2,6-tolylene diamine in ratios of 80/20 and 65/35 and the like. Upon hydrogenation, the corresponding positional isomers result. The compositions in accordance with this invention are prepared by reacting an isomer or mixture of isomers of methylcyclohexylene diamine with at least two mols of an alkylene oxide. Depending upon the quantity of the alkylene oxide used in the reaction, the number of the hydrogen atoms on the nitrogen which will be replaced by the alkylene oxide residue is determined. When 4 or more moles of alkylene oxide is used for each mol of diamine then all of the reactive hydrogen atoms are replaced. When 2 moles of alkylene oxide per mol of diamine is used then one hydrogen on each of the amino groups is replaced by an alkylene oxide residue. In other words, at least one hydrogen atom on every nitrogen atom is replaced by an alkylene oxide residue. By alkylene oxide residue is meant a radical having the formula

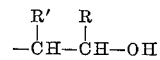

wherein R and R' are hydrogen, lower alkyl or phenyl. The reaction between the methylcyclohexylene diamine and the alkylene oxide can be conducted in the presence of a suitable inert solvent in which the methylcyclohexylene diamine is slurried or dissolved. The alkylene oxide is then introduced with agitation of the entire body which is heated to a temperature of about 70° C. to about 170° C. The reaction is carried out under atmospheric or super-atmospheric pressure and to the extent required any exothermic heat can be removed by any conventional heat transfer means. Any suitable solvent which permits a sufficiently high reaction temperature such as toluene, xylylene, diethyl carbitol, dibutyl carbitol, dibutyl ether or the like can be used in conducting the reaction.

Any suitable alkylene oxide or mixture of alkylene oxides can be used in the preparation of the compositions in accordance with this invention such as, for example, ethylene oxide, 1,2-propylene oxide, styrene oxide, 1,2-butylene oxide, 1,2-hexylene oxide, 1,2-heptylene oxide, 2,3-butylene oxide, 3,4-hexylene oxide and the like. In those cases where it is desired to add 4 or less moles of alkylene oxide to the diamine then water is the preferred solvent as exemplified in Example 2.

The amount of alkylene oxide used in reaction with the methylcyclohexylene diamine is determined by the average molecular weight of the product desired. For adducts described herein which have utility as intermediates in the preparation of foams, the molecular weights based on the hydroxyl value can range from 344 to about 10,000 or more. To obtain such products having the desired molecular weight, the methylcyclohexylene diamine is treated with an alkylene oxide in accordance with the procedure set forth above and in the ratios desired if less than all of the active hydrogen atoms on the nitrogen atoms are to be replaced. Where higher molecular weight compounds are desired, the alkylene oxide is further reacted with the hydroxyl groups present after reaction of one equivalent of an alkylene oxide with each hydrogen on the nitrogen atoms. The quantity of alkylene oxide reacted with each hydroxyl group of each product can range from 1 to about 100 mols or more. In the second instance, that is, where the alkylene oxides are reacted with hydroxyl groups rather than with the amino groups, it is desirable that a catalyst be present in order to promote this reaction. Any suitable catalyst can be used, however, it is preferred to use alkine catalysts such as, for example, alkali metal catalysts including sodium hydroxide, potassium hydroxide, potassium t-butoxide and the like. The amount of catalyst employed is generally in the range of 0.002 to 2.0 percent by weight based on the total amount of reactants including the alkylene oxide or mixtures thereof appearing in the reaction product. Thus, in accordance with the formula represented above, the value of $n$ can range from 0 to 100 or more, must equal at least 1 at least twice in the molecule. In the first step of the procedure, that is, wherein an alkylene oxide is reacted with amino groups no catalyst is necessary; however, when conducting the reaction in order to prepare a polyether, it is preferred to utilize a catalyst as stated above. The catalyst may be added either initially or after the formation of the reaction product of amino groups with alkylene oxides.

The compositions in accordance with this invention also includes block polymers wherein initially one alkylene oxide is reacted with the methylcyclohexylene diamine and then subsequently in the presence of a catalyst, a different alkylene oxide is reacted with the product prepared from the first reaction. An example of this would be where ethylene oxide is first reacted with all of the amino groups present and then subsequently propylene oxide is reacted with the hydroxyl groups formed by the reaction of ethylene oxide with the diamine. Of course, any combination of the above-mentioned alkylene oxides may be used. Further, mixed copolymers can be prepared by reacting a mixture of alkylene oxides such as ethylene oxide and propylene oxide with the diamine.

The average molecular weight and reactivity of the alkylene oxide adducts prepared herein can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide-methylcyclohexylene diamine reaction product and is determined by reacting acetic anhydride or phthalic anhydride (in pyridine solution) at refluxing temperature with the hydroxyl groups of the reaction product. The unreacted anhydride and acetic acid or phthalic acid formed are titrated with aqueous sodium hydroxide using phenolphthalein as an indicator. The molecular weight can be readily calculated from the hydroxyl number by using the formula:

$$M.W. = \frac{\text{Functionality} \times 1000 \times 56.1}{\text{Hydroxyl No.}}$$

In the preparation of cellular polyurethanes utilizing the alkylene oxide adducts of methylcyclohexylene diamine, any suitable blowing agent may be used which causes the reaction mixture to expand by the generation of gas during the isocyanate polyaddition reaction. The blowing agent may be water which reacts with isocyanates to produce carbon dioxide, a temperature sensitive blowing agent such as, for example, a halohydrocarbon including trichlorofluoromethane, dichlorodichloromethane, trichlorotrifluoroethane, dichlorodifluoromethane and the like, an alkane such as butane, hexane, heptane and the like, methylene chloride or any other suitable blowing agent and mixtures thereof.

Any suitable organic polyisocyanate may be used in the practice of this invention such as, for example, ethylene diisocyanate, propylene diisocyanate, tetramethylene diisocyanate, pentamethylene diisocyanate, octamethylene diisocyanate, undecamethylene diisocyanate, dodecamethylene diisocyanate, 3,3'-diisocyanato dipropylether, etc.; cyclopenthylene-1,3-diisocyanate, cyclohexylene-1,4-diisocyanate, 2,4-tolylene diisocyanate, 2,6-tolylene diisocyanate and mixtures of 2,4- and 2,6-tolylene diisocyanate, xylylene-1,4-diisocyanate, xylylene-1,3-diisocyanate, 4,4'-diphenylmethane diisocyanate, 2-nitrodiphenyl-4,4'-diisocyanate, 4,4'-diphenylpropane diisocyanate, p-isocyanato benzyl isocyanate, m-phenylene diisocyanate, p-phenylene diisocyanate, naphthylene-1,4-diisocyanate, naphthylene-1,5-diisocyanate, furfurylidene diisocyanate, p,p',p''-triphenylmethane triisocyanate, diphenyl-4,6,4'-triisocyanate and the like. Also, suitable are crude polyisocyanates such as crude 4,4'-diphenylmethane diisocyanate which is generally referred to as a polyaryl alkylene polyisocyanate. Any such compound including those disclosed in U.S. Pat. 2,683,730 may be also used in the process of this invention. In addition to the reactants set forth above, other known accelerators, stabilizers, emulsifiers and the like may be incorporated into the reaction mixture to achieve the results currently attributed to them.

The cellular polyurethanes in accordance with this invention are particularly suitable in the manufacture of rigid polyurethane foams which find application insulation, curtain wall constructions, for filling large volumes such as airplane wings and the like.

The invention is further illustrated but not limited by the following examples in which parts are by weight unless otherwise specified.

EXAMPLE 1

Preparation of an isomeric mixture of 80% 1-methylcyclohexylene-2,4-diamine and 20% 1-methylcyclohexylene-2,6-diamine: About 300 parts of an isomeric mixture of 80% 2,4- and 20% 2,6-tolylene diamine are charged to a stainless steel autoclave and 30 parts of cobalt oxide, 45 parts of calcium oxide and 19.5 parts of sodium carbonate as catalyst are added. The autoclave is closed, purged with hydrogen gas to remove all oxygen, heated to 180° C. and stirred. The temperature is raised to 230° C. and the autoclave is pressurized with hydrogen to 4000 p.s.i.g. for 3 hours, at which time the absorption of hydrogen has practically stopped. The autoclave is cooled to 80 to 120° C., the material discharged and the catalyst removed by filtration. The yield of methylcyclohexylene diamine isomers is 72.5%.

EXAMPLE 2

Preparation of a mixture of approximately 80%

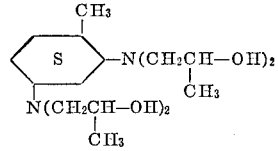

and 20%

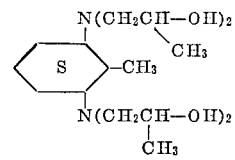

The equipment consists of a three-necked flask, equipped with a mechanical stirrer, thermometer, addition burette and a dual condenser system consisting of a Dry Ice-acetone condenser on top of a water condenser.

To the flask is charged about 256 parts (2.0 mols) of the methylcyclohexylene diamine isomeric mixture prepared in accordance with Example 1 and about 72 parts (4 mols) of water. The system is first purged with nitrogen and then about 468 parts (8.08 mols) of propylene oxide are added, with stirring, at about 79–88° C. over a period of about 7 hours. An additional 6 hours of stirring at 87–95° C. is required to effect complete reaction of all the propylene oxide. To the crude product is added about 200 parts by volume of toluene, and all water is removed by azeotropic distillation. The toluene is removed by distillation in vacuo. The final temperature is about 160° C. at a vacuum of 2 mm. Hg. The product is a water-white glass.

EXAMPLE 3

Preparation of a propylene oxide-methylcyclohexylene diamine (80:20-2,4-2,6) adduct of molecular weight approximately 3800: The equipment is the same as that of Example 2. To the flask is added about 120 parts (about 0.333 mol) of the product obtained in Example 2, about 67.5 parts of toluene and a solution of about 11.3 parts of potassium hydroxide in about 11.3 parts of water. The mixture is thoroughly purged with nitrogen at about 100° C. All water is removed by azeotropic distillation with toluene and then the toluene is removed by distillation in vacuo. To the stirred mixture is added about 1172 parts of propylene oxide over a period of about 8 hours at about 122 to about 160° C. Stirring is continued for an additional hour at about 130° C. after the end of addition. To the crude reaction mixture is added about 79 parts of water, 17 parts of toluene and sufficient 12.5% sulfuric acid solution (about 66 parts) to bring the final pH of a solution of 10 parts of polyol in about 60 parts by volume of a 10:6 isopropanol-water mixture to 9.3. The neutralization is conducted at 70–80° C. with vigorous stirring for about 4.5 hours. All toluene and water are removed in vacuo (maximum temperature 140° C.) and the dry polyol is filtered hot under suction through a preformed filter cake of high flow Super-Cel. The final product is an orange oil with a molecular weight (OH number) of approximately 3800.

EXAMPLE 4

Preparation of a flexible polyurethane foam from the propylene oxidemethylcyclohexylene adduct of molecular weight 3800: To a vigorously-stirred mixture of about 100 parts of the polyol prepared in Example 3, about 3 parts water, about 0.20 part stannous octoate, about 0.1 part triethylene diamine, about 0.5 part N-ethylmorpholine and about 1.5 parts of a siloxane oxyalkylene block polymer having the formula $$C_2H_5-Si\left[-O-\left(\underset{\underset{CH_3}{|}}{\overset{\overset{CH_3}{|}}{Si}}-O\right)_6-(C_nH_{2n}O)_{30}C_4H_9\right]_3$$

wherein ($C_nH_{2n}O$) is a mixed polyoxyethylene and oxypropylene block copolymer containing about 17 oxyethylene units, and about 13 oxypropylene units, is rapidly added about 48 parts of an isomeric mixture of 80%, 2,4- and 20% 2,6-toluylene diisocyanate. Stirring is continued until a cream stage is reached, at which time the mixture is rapidly poured into a cardboard container. Rise time for the foam is about 2 minutes. After curing in an oven at about 100° C., an excellent flexible foam is obtained.

EXAMPLE 5

Preparation of rigid polyurethane foam using the adduct from Example 2 as a component: To a vigorously stirred mixture of about 15 parts of the adduct prepared in Example 2, about 85 parts of a mixture of about 65 parts of a propylene oxide adduct of 1,1,3-p-hydroxyphenylpropane having an OH number of 223 and about 35 parts of the propylene oxide adduct of glycerine having an OH number of about 652, about 0.7 part triethylene diamine, about 1 part of a siloxane oxyalkylene block polymer having the formula $$C_2H_5-Si\left[-O-\left(\underset{\underset{CH_3}{|}}{\overset{\overset{CH_3}{|}}{Si}}-O\right)_6-(C_nH_{2n}O)_{30}C_4H_9\right]_3$$

wherein ($C_nH_{2n}O$) is a mixed polyoxyethylene and oxypropylene block copolymer containing about 17 oxyethylene units and about 13 oxypropylene units and about 40 parts trichlorofluoromethane are rapidly added. About 109 parts of an isomeric mixture of 80% 2,4- and 20% 2,6-toluylene diisocyanate. When a cream stage is reached, the mixture is rapidly poured into a cardboard container and after rising has ceased, is cured in an oven at about 100° C.

EXAMPLE 6

Preparation of a mixture of 80%

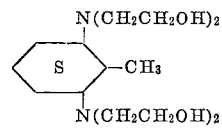

and 20%

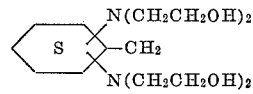

The equipment consists of a 3-necked flask, equipped with a mechanical stirrer, thermometer, ethylene oxide, inlet tube and a dual condenser system consisting of a Dry Ice-acetone condenser on top of a water condenser. To the flask is charged 256 parts (2 mols) of the isomeric methylcyclohexylene diamine mixture prepared in accordance with Example 1 and about 772 parts (4 mols) of water. With stirring, the solution is purged with nitrogen. At a reaction temperature of about 70 to about 93° C. with stirring, about 357 parts (8.1 mols) of ethylene oxide is added over a period of about 2 hours. Stirring is continued for an additional hour at 89–90° C. The crude reaction mixture weighs about 683 parts, theoretical weight for diamine plus water plus ethylene oxide=685 parts. To the reaction mixture is added about 200 parts by volume of toluene and all water is removed by azeotropic distillation. The toluene is removed by distillation in vacuo, final distillation conditions are a pot temperature of about 158° C. and a vacuum of about 1.5 mm. Hg. The product is a water-white liquid.

It is, of course, to be understood that any of the alkylene oxide adducts of methylcyclohexylene diamine set forth above can be utilized in the working examples for those more specifically set forth herein in that the invention is not to be limited to these examples.

Although the invention has been described in considerable detail for the purpose of illustration, it is to be understood that variations can be made by those skilled in the art without departing from the spirit of the invention.

What is claimed is:

1. Oxyalkylated methylcyclohexylene diamine compounds selected from the group consisting of a diamine having the formula:

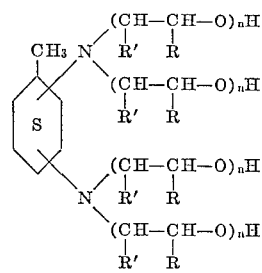

wherein R and R' are selected from the group consisting of hydrogen, lower alkyl or phenyl and $n$ is 0 or a positive integer with the proviso that $n$ is a positive integer at least once on each nitrogen atom, and mixtures of diamines of the above formula.

2. The diamine compounds of claim 1 wherein $n$ is 0 or a positive integer of from 1 to 100.

3. A diamine compound of claim 1 wherein the oxyalkylated methylcyclohexylene diamine is an oxyalkylated 1-methylcyclohexylene-2,4-diamine.

4. The diamine compounds of claim 1 comprising an isomeric mixture of an oxyalkylated 1-methylcyclohexylene-2,4-diamine and an oxyalkylated 1-methylcyclohexylene-2,6-diamine.

5. The isomeric mixture of claim 4 comprising 80 percent of an oxyalkylated 1-methylcyclohexylene-2,4-diamine and 20 percent of an oxyalkylated 1-methylcyclohexylene-2,6-diamine.

6. The mixture of claim 5 wherein the oxyalkylated 1-methylcyclohexylene-2,4-diamine is

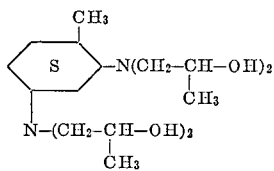

and the oxyalkylated 1-methylcyclohexylene-2,6-diamine is

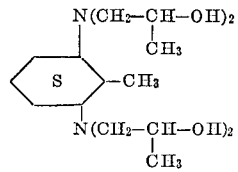

7. The mixture of claim 5 wherein the oxyalkylated 1-methylcyclohexylene-2,4-diamine is

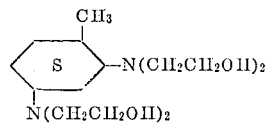

and the oxyalkylated 1-methylcyclohexylene-2,6-diamine is

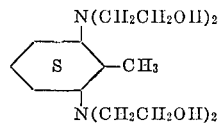

References Cited

UNITED STATES PATENTS 2,187,823  1/1940  Ulrich et al. _____ 260—563

CHARLES B. PARKER, Primary Examiner

D. R. PHILLIPS, Assistant Examiner

U.S. Cl. X.R.

252—151; 260—2.5, 830